United States Patent
Safai (10) Patent No.: US 11,022,571 B2
(45) Date of Patent: Jun. 1, 2021

(54) X-RAY SCATTERING METHOD AND SYSTEM FOR NON-DESTRUCTIVELY INSPECTING BOND LINE AND POROSITY

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 16/426,070

(22) Filed: May 30, 2019

(65) Prior Publication Data
US 2020/0378905 A1   Dec. 3, 2020

(51) Int. Cl.
*G01N 23/201*   (2018.01)
(52) U.S. Cl.
CPC ..... *G01N 23/201* (2013.01); *G01N 2223/054* (2013.01); *G01N 2223/6462* (2013.01)

(58) Field of Classification Search
CPC .... G01N 23/00; G01N 23/201; G01N 23/203; G01N 23/04; G01N 2223/054; G01N 2223/6462; G01V 5/0025
See application file for complete search history.

(56) References Cited

U.S. PATENT DOCUMENTS

| | | | |
|---|---|---|---|
| 2006/0055400 A1 | 3/2006 | Safai et al. | |
| 2006/0280924 A1 | 12/2006 | Morin | |
| 2008/0273662 A1* | 11/2008 | Yun | G01N 23/207 378/74 |
| 2015/0110249 A1 | 4/2015 | Bakeman et al. | |

FOREIGN PATENT DOCUMENTS

EP    3258253 A1    12/2017
WO    2013025737 A1    2/2013

* cited by examiner

*Primary Examiner* — Jurie Yun
(74) *Attorney, Agent, or Firm* — Coats & Bennett, PLLC (57) ABSTRACT

Non-destructive inspection methods, systems, and apparatuses are disclosed for non-destructively inspecting a bond line, including a bond line present in a composite substrate and in a adhesive material layers in a composite substrate, with the methods, systems, and apparatuses incorporating a small angle X-ray scattering array.

20 Claims, 8 Drawing Sheets

X-RAY SCATTERING METHOD AND SYSTEM FOR NON-DESTRUCTIVELY INSPECTING BOND LINE AND POROSITY

TECHNOLOGICAL FIELD

The present disclosure relates generally to the field of non-destructive testing and non-destructive inspection of sub-surface regions of target structures and substrates. More specifically the present disclosure relates to the field of using small angle X-ray backscattering techniques to non-destructively inspect interlayers for characteristics that include, for example, bonding strength of composite material layers.

BACKGROUND

Presently, regulatory guidelines relating to the inspection of bonded composite materials in certain industries mandate the use of testing techniques that destroy the material being tested. This results in significant expense, as large structures that contain composite parts, such as, for example, aircraft and other vehicles, must be taken out of service, destructively inspected, and then reworked before the aircraft can be placed back into service.

Non-destructive inspection systems for evaluating substrates have found utility in industry, for example, where access to various components and substrate materials requiring routine service and inspection may be difficult to access without significant labor or without partially, or completely, destroying the component or substrate material. For a non-destructive testing method or system to supplant the mandatory destructive methods presently in use, a non-destructive testing method must insure consistently reliable and repeatable analysis of a inspected object's surface or subsurface that at least equals or exceeds the physical determinations made during destructive testing.

SUMMARY

Aspects of the present aspects, methods, apparatuses and systems are disclosed that relate to the use of small angle X-ray backscattering techniques to non-destructively inspect interlayers for the purpose of confirming with precision the presence or absence of anomalies in the interlayer that could impact optimal bonding when the interlayer is an adhesive layer.

Aspects of the present methods, systems, and apparatuses create refined imaging at the nano-scale level imaging for, among other things, inspecting composite material adhesive interlayers. When the imaging produced according to presently disclosed techniques does not reveal any anomalies within a composite material adhesive interlayer, the non-destructive inspection confirms that a satisfactory bond has been established, such that the inspected region would pass any mandated bonding strength testing protocols that would otherwise cause the destruction of the inspected material.

According to one present aspect, a method for non-destructively inspecting a bond line and bond line region of a composite material is disclosed, with the method including positioning a small angle X-ray scattering system proximate to a composite material, with the composite material including a plurality of composite ply stacks, and with the composite ply stacks including a plurality of composite plies. The composite ply stacks include a layer of adhesive material interposed between the composite ply stacks, with the composite material further including a bond line region disposed within the layer of adhesive material. The small angle X-ray scattering system includes a plurality of small angle X-ray scattering system components positioned on a composite material first side, including a monochromatic X-ray tube, a first pinhole aperture and a second pinhole aperture positioned a predetermined distance from the X-ray tube; a first vacuum chamber positioned proximate to the pinhole apertures and the composite material first side. A number of small angle X-ray scattering system components are positioned on a composite material second side, including: a second vacuum chamber positioned proximate to the composite material second side, with the second vacuum chamber in communication with an X-ray scintillator; a charged coupled device camera in communication with the scintillator, with the scintillator comprising a scintillating layer Presently disclosed methods further include activating the small angle X-ray scattering system to emit an X-ray beam from the monochromatic X-ray tube; detecting scattered X-rays on the scintillating layer; and generating imaging signals based on the scattered X-rays impacting the scintillating layer According to further aspects, presently disclosed methods further include sending the imaging signals of the scattered X-rays generated on the scintillating layer to a computing device; converting the imaging signals into an image; and displaying the bond line region of the composite component as a bond line region image on a small angle X-ray scattering system output.

According to another aspect, disclosed methods include detecting the presence or absence of anomalies present in the bond line region.

Further aspects disclose non-destructively detecting anomalies in a bond line of a composite material, wherein the anomalies detected in the bond line region can comprise a dimension ranging from less than 1 nm to about 1.0 mm or more.

Further aspects disclose a system for non-destructively inspecting a substrate comprising a composite material, with the system configured to detect nano-scale anomalies in a substrate bond line, including, for example, a substrate bond line in an epoxy-based composite material substrate, and further including, for example, a bond line in an adhesive layer in a composite substrate. According to a present aspect, the disclosed non-destructive inspection systems are configured to non-destructively inspect substrates, including substrates that include a substrate material having a substrate material first side, a substrate material second side, and at least one interlayer interposed between the substrate material first and second sides. The presently disclosed non-destructive inspection system includes a small angle X-ray scattering system including a microscopic high-resolution nano-focus monochromatic X-ray for non-destructively inspecting a substrate. The system further includes first side system components positioned on a substrate material first side, with the first side system components including: a monochromatic X-ray tube; a first pinhole aperture and a second pinhole aperture positioned a predetermined distance from the X-ray tube; a first vacuum chamber positioned between first pinhole aperture and second pinhole aperture. The system further includes second side system components positioned on a substrate material second side, with the second side system components including a second vacuum chamber positioned proximate to the composite material second side, with the second vacuum chamber in communication with an X-ray scintillator a charged coupled device in communication with the scintillator, and with the X-ray scintillator comprising a scintillating layer. The system further includes imaging software in communication with the charged coupled device, a display in communication with the imaging software, and wherein the system is configured to inspect the substrate material interlayer region.

According to another aspect, a method for non-destructively inspecting a bond line of an adhesive material layer of a composite material is disclosed, with the method including positioning a small angle X-ray scattering apparatus proximate to a composite material substrate, with the composite material substrate including an adhesive material layer, and with the adhesive material layer including a bond line. The method further includes directing X-rays from the small angle X-ray scattering apparatus to the composite substrate material and detecting scattered X-rays on an X-ray detector, generating imaging signals of the scattered X-rays detected on the detector, generating an image from the imaging signals, and non-destructively determining the integrity of the bond line.

In a further aspect, the substrate material interlayer region comprises a bond line.

In another aspect, at least a portion of the substrate material includes a composite material.

In a further aspect, at least a portion of the substrate material includes a metallic material or a non-metallic material, or combinations thereof.

In a further aspect, the substrate is a primary structure for an aircraft, with the primary structure including a composite material.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having described variations of the disclosure in general terms, reference will now be made to the accompanying drawings, which are not necessarily drawn to scale, and wherein.

DETAILED DESCRIPTION

X-rays are a form electromagnetic radiation, typically having a wavelength ranging from 0.01 to 10 nanometers, corresponding to frequencies ranging from 30 petahertz to 30 exahertz ($3 \times 10^{16}$ Hz to $3 \times 10^{19}$ Hz) and energies in the range of 100 eV to 100 keV. X-ray backscatter systems are a type of X-ray imaging system using X-rays to inspect a target object. X-ray backscatter systems typically comprise an X-ray tube, a collimator, and a detector. The X-ray tube generates and emits X-rays. The collimator filters the X-rays to form an X-ray beam using a portion of the X-rays that travel substantially parallel to a specified direction.

When the X-ray beam encounters the target object, some, or all, of the X-rays in the X-ray beam are scattered by the target object in various directions. In particular, the X-rays may be scattered from the surface of the target object from the sub-surface of the target object. The scattered X-rays are referred to as backscatter. When the backscatter impacts a detector, the detected backscatter can be used to generate image data for the target object being investigated. For example, the backscatter detected when the X-ray beam is directed to a particular location on or within a particular target object, can be used to generate an intensity value for a pixel in an image that corresponds to that particular location on or within the target object. The use of X-rays for non-destructive material evaluation allows inspection without destroying parts, components, substrates, etc., being inspected (e.g. the target object).

Small angle X-ray scattering (SAXS) is a non-destructive method used to investigate nanostructures present in solids and/or liquids. In a SAXS protocol an X-ray beam impacts a nanostructured sample including, for example proteins, macromolecules, nanoparticle dispersions, etc. Several imaging techniques have been used to characterize nanostructures by "averaging" results of a particular sample. Because such methods do not accurately represent the state of a specific site at a nanoscale level, such methods would not be useful in determining with certainty, the characterization of a bonding layer. Known non-destructive inspection techniques that merely average a characteristic over an area of a substrate (and that do not provide a specific image and inspected result for a specific individual point within an area being investigated cannot be considered as a reliable non-destructive inspection technique of the type that could replace the required destructive inspection techniques that are "point-specific" with respect to a particular specific region or a substrate being investigated.

Typical SAXS systems consist of an X-ray source, a collimator, a sample stage and a detector in communication with appropriate software used to interpret the measured X-ray scattering data obtained on a scintillator. The X-ray source emits an X-ray beam that interacts with the electrons of a targeted sample to determine structural parameters such as particle size, shape, internal structure, porosity and orientation. The scattered X-rays are recorded at different angles, with the scattering pattern at small angles analyzed typically below about 10° to probe nano-sized particles and domains in a size range of from about 1 to about 100 nm (diameter). Before scattering upon impacting a sample, X-rays are transformed into a well-defined point-shaped beam via collimation. Point-collimated beams can be used to analyze anisotropic samples such as fibrous materials or porous solids Aspects of the present aspects, methods, apparatuses and systems are disclosed that relate to the incorporation of modified small angle X-ray backscattering systems, arrays, and apparatuses in combination with a charged couple device to produce two dimensional nano-scale microscopic images to non-destructively inspect one or more adhesive interlayers of composite materials comprising bond lines for the purpose of confirming with precision the presence or absence of anomalies in the adhesive interlayer(s) that, if present, could impact optimal bonding of composite materials.

Aspects of the present methods, system, and apparatuses create refined imaging at the nano-scale level imaging for, among other things, inspecting composite material adhesive interlayers for the purpose of non-destructively inspecting bond lines between joined composite materials and bond lines between composite materials joined to metals, as well as non-destructively inspecting the porosity of the adhesive material interlayers between composite materials and between composite materials joined to metals. According to present aspects, when the imaging produced according to presently disclosed techniques does not reveal the presence of anomalies within an adhesive material interlayer, presently disclosed non-destructive inspection methods confirm that a satisfactory bond has been established, such that the non-destructively inspected region would pass mandated bonding strength destructive testing protocols that would otherwise cause the destruction of the inspected material.

The small angle X-ray backscattering non-destructive techniques made possible by the presently disclosed systems, apparatuses, and methods allow for not only a non-destructive confirmatory inspection method of a composite material adhesive interlayer that can be in a cured state, but also allows for the generation of a visual image of the composite material adhesive interlayer at a nano-scale.

According to present aspects, the generation of an image (and the ability of present systems, apparatuses, and methods to generate such an image) that can be visually appraised by an operator, or otherwise "viewed" and confirmed by an automated means (e.g., a robot comprising a laser or other reading means, etc.), results in a heightened level of conclusively identifying and determining that actual state of the bonding interlayer. That is, the nano-scale image generation made possible according to present aspects allows for, and results in, the ability to concretely identify, with certainty, the presence or absence of the type of anomalies in the composite material adhesive interlayer that (if present) could impact bonding integrity of the composite material (e.g., lead to premature delamination of composite layers, etc.). The enhanced non-destructive detection and identification of adhesive interlayer anomalies made possible according to present aspects facilitates a safer, more certain inspection technique having a heightened integrity as compared with the currently known destructive inspection techniques that regulatorily mandated.

The enhanced safety, greater certainty and increased integrity of the present methods, systems, and apparatuses is due, at least in part, to the ability to view more sites, along an inspection region of a particular structure, as well as the ability to determine the presence or absence of a specific number of anomalies present in such interlayers. This is in contrast to currently mandated destructive inspection techniques, wherein a particular structural composite part may pass a mandated tensile strength testing, shear testing, and/or peel strength testing and yet, a small number of anomalies that go undetected may actually be present in the tested region of a composite structure that passes under the currently accepted destructive testing protocols.

In strong contrast to accepted and mandated destructive testing protocols, aspects of the presently disclosed systems, apparatuses, and methods provide certainty that an inspected region of a composite material adhesive interlayer contains any, some, or none of the types of anomalies that are unwanted in the interlayer, and that could potentially contribute to a downstream quality condition that should undergo rework, but that would otherwise evade currently accepted destructive testing protocols.

Some anomalies that can exist in composite material adhesive interlayers, and that now can be detected according to aspects of presently disclosed apparatuses, systems, and methods include nano-scale anomalies such as, for example, micro-pores, crystallization, areas of disbands, so-called "kissing disbonds", and other areas of very fine material separation, etc.

Figure 1:
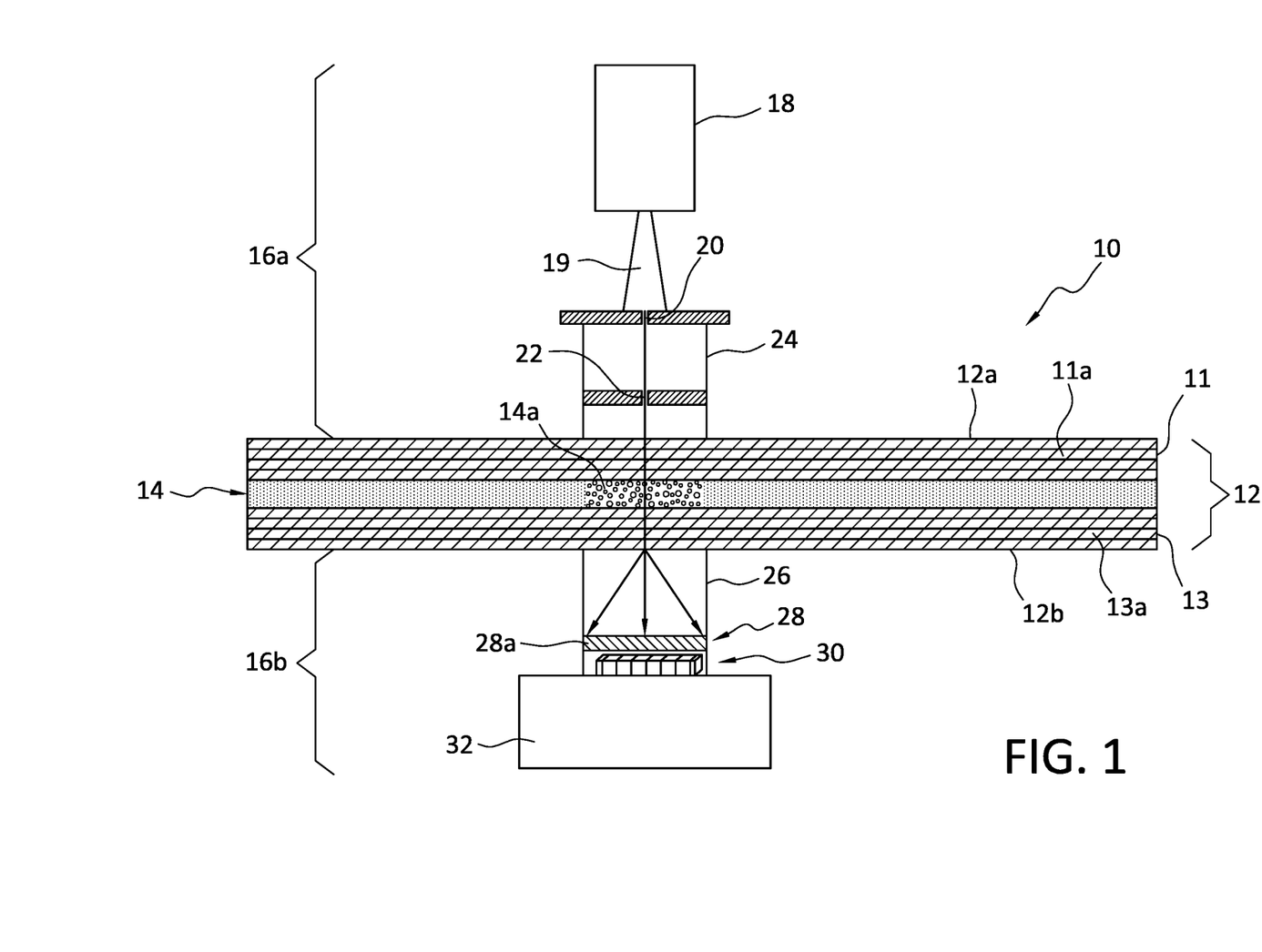
FIG. 1 is an illustration of an apparatus and system according to present aspects.

FIG. 1 is a schematic representation, not necessarily drawn to scale, of a non-destructive inspection system and apparatus according to a present aspect. As shown in FIG. 1, a composite substrate 12 (also referred to equivalently herein as a "composite material substrate") can include a composite substrate first side 11 and a composite substrate second side 13, with an adhesive material layer 14 including the bond line 14a (equivalently referred to herein as a "bond line region"), with the adhesive material layer 14 interposed between the composite substrate first side 11 and the composite substrate second side 13. As further shown, a portion of the adhesive material layer 14 including the bond line 14a is magnified to show a magnified region of the bond line 14a. Composite substrate first side 11 comprises a composite substrate first side stack 12a comprising a plurality of composite substrate first side composite plies 11a. Composite substrate second side 13 comprises a composite substrate second side stack 12b comprising a plurality of composite substrate second side composite plies 13a.

FIG. 1 further illustrates a small X-ray angle X-ray scattering inspection system 10 for non-destructively inspecting an adhesive material layer (equivalently referred to herein as an "adhesive interlayer") of a substrate, and further non-destructively inspecting the bond line of the adhesive material layer. The small X-ray angle X-ray scattering inspection system 10 as shown comprises a small angle X-ray backscattering array with certain small angle X-ray backscattering components collectively shown as small angle X-ray scattering first side components 16a located (e.g., positioned, etc.) proximate to (e.g., adjacent to, etc.) or "above" a composite substrate first side 11, and certain small angle X-ray backscattering components collectively shown as small angle X-ray scattering second side components 16b located (e.g., positioned, etc.) proximate to (e.g., adjacent to, etc.) or "below" a composite material second side 13.

As further shown in FIG. 1, the small angle X-ray backscattering components collectively shown as small angle X-ray scattering first side components 16a comprise an X-ray source 18, shown as a monochromatic X-ray tube capable of emitting an X-ray beam 19, a first pinhole aperture 20, a second pinhole aperture 22 with a first vacuum chamber 24. Further small angle X-ray backscattering components collectively shown as small angle X-ray scattering second side components 16b comprise a second vacuum chamber 26, X-ray scintillator (including X-ray scintillating layer 28a) and a charge coupled device (CCD) 30 in communication with the scintillator 28. The charged couple device (CCD) can be a CCD camera that is able to receive and/or interpret signals from the scintillator 28 and can further be configured to generate imaging signals and/or facilitate microscopic imaging. (shown in FIG. 2) As shown in FIG. 1, the small angle X-ray backscattering components can be supported by support 32.

Figure 2:
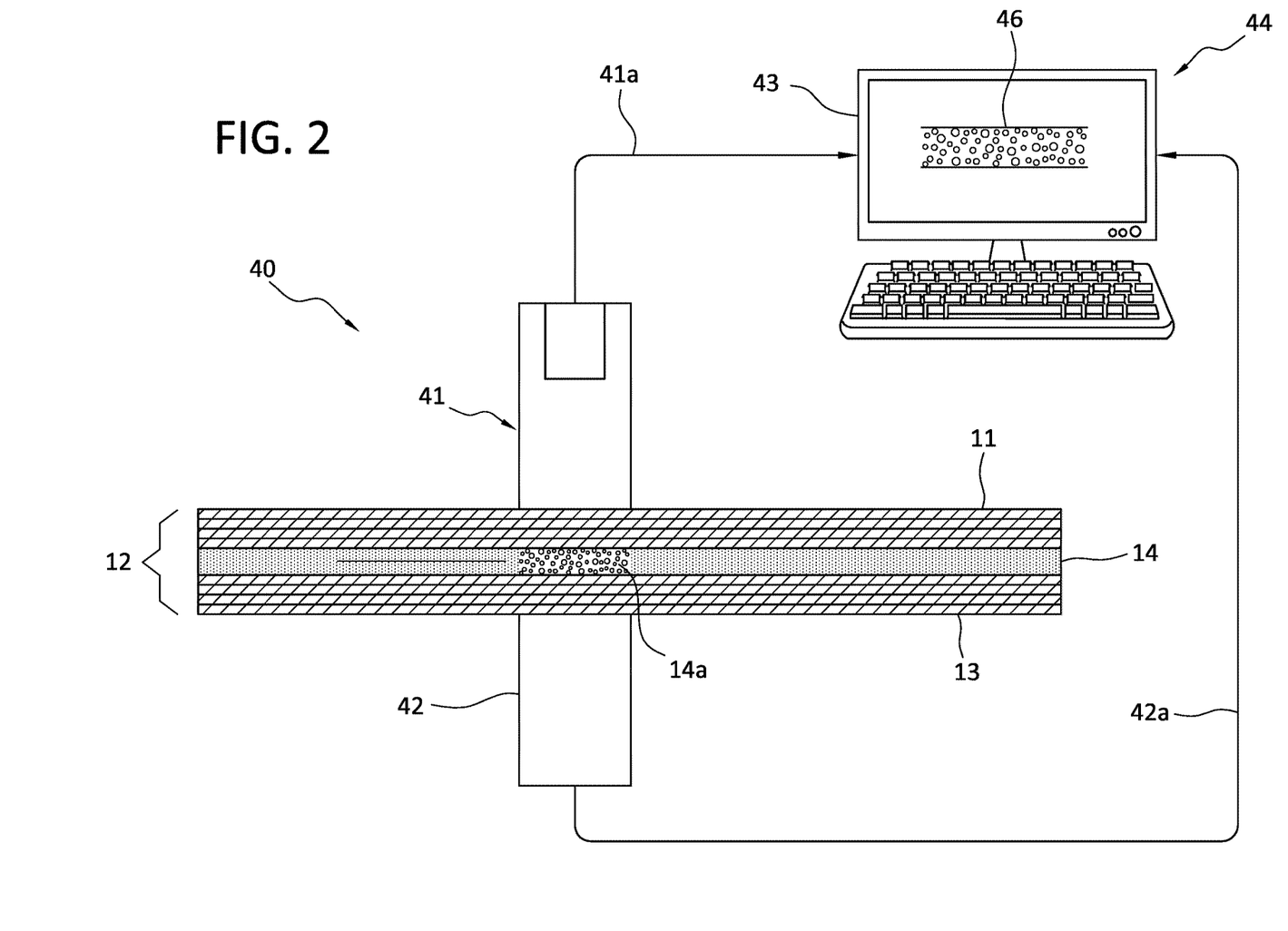
FIG. 2 is an illustration of an apparatus and system according to present aspects.

FIG. 2 is a representative schematic illustration, not necessarily drawn to scale, of a system 40 of the general type shown in FIG. 1, with the small angle X-ray backscattering components collectively shown as composite substrate first side components 16a (as shown in FIG. 1) that are shown collectively in FIG. 2 as inspection head 41, and with the small angle X-ray backscattering components collectively shown as composite substrate second side components 16b (shown in FIG. 1), shown collectively in FIG. 2 as camera head 42. FIG. 2 further shows the composite substrate 12 as also shown in FIG. 1, including composite substrate first side 11 and a composite substrate second side 13, with an adhesive material layer 14 including a magnified portion of the adhesive material 14 showing a bond line 14a in the adhesive layer 14 interposed between the composite substrate first side 11 and the composite substrate second side 13.

As further shown in FIG. 2, inspection head 41 is in communication with imaging software 43 and a display 44 via hard connection 41a or via a wireless communication. As further shown in FIG. 2, camera head 42 is in communication with imaging software 43 and a display 44 via hard connection 42a or via a wireless communication. According to a further aspect, in substantially real time, display 44 can display a magnified image 46 of the section of adhesive material layer 14 of the composite substrate 12 that is interrogated or otherwise non-destructively under inspection by the system 40. Imaging signals sent by the inspection head 41 and camera head 42 to the imaging software 43 are interpreted and converted into an image or images 46 that can be evaluated from the display 44 that can be in proximity to the system 40 or the images 46 can be located and accessed remotely using appropriate hardware, software, and or networks including, for example, the internet, access to cloud storage, etc., as appropriate.

Figure 3:
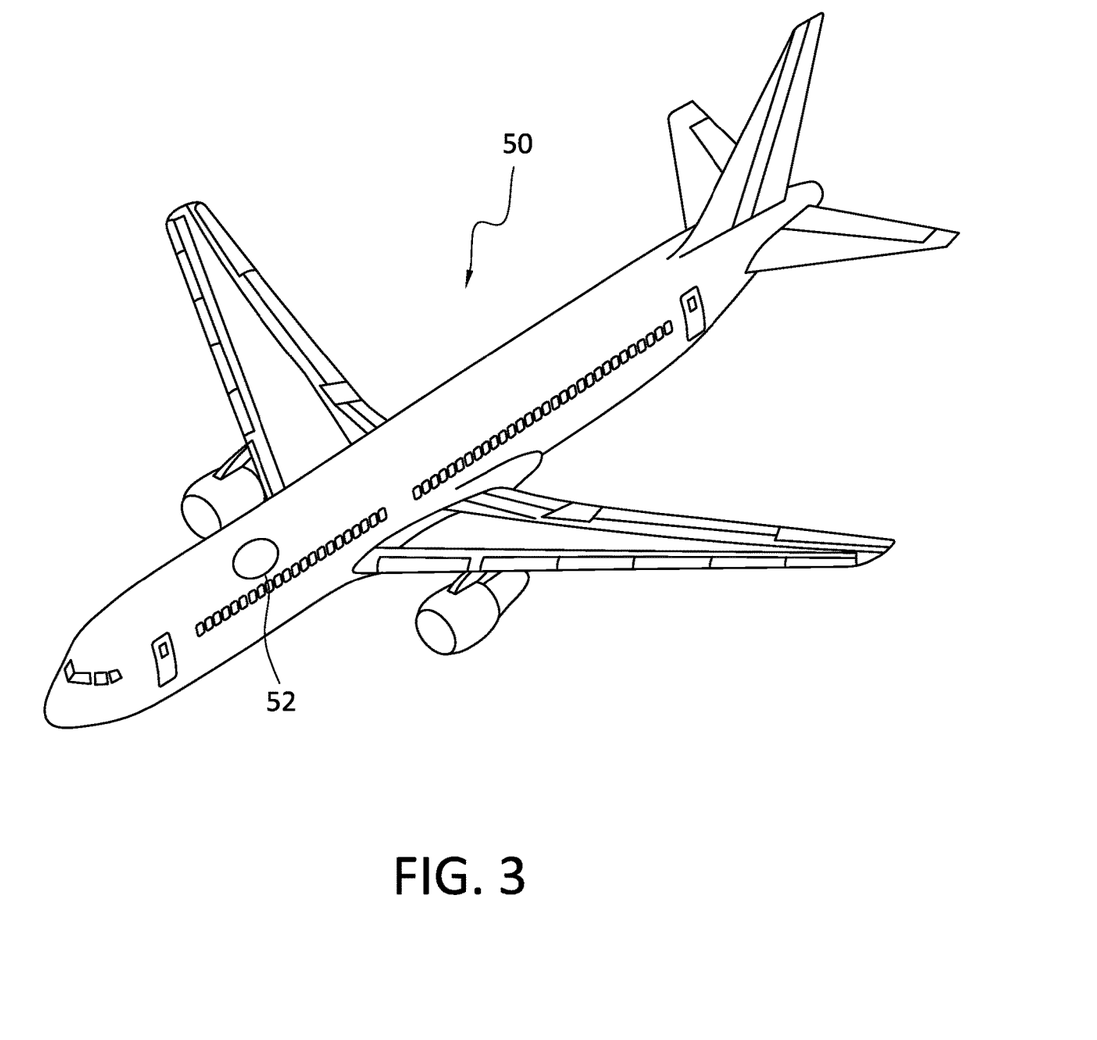
FIG. 3 is a representative illustration of an aircraft comprising composite structures that can be non-destructively tested according to present aspects.
Figures 4A, 4B, 5:
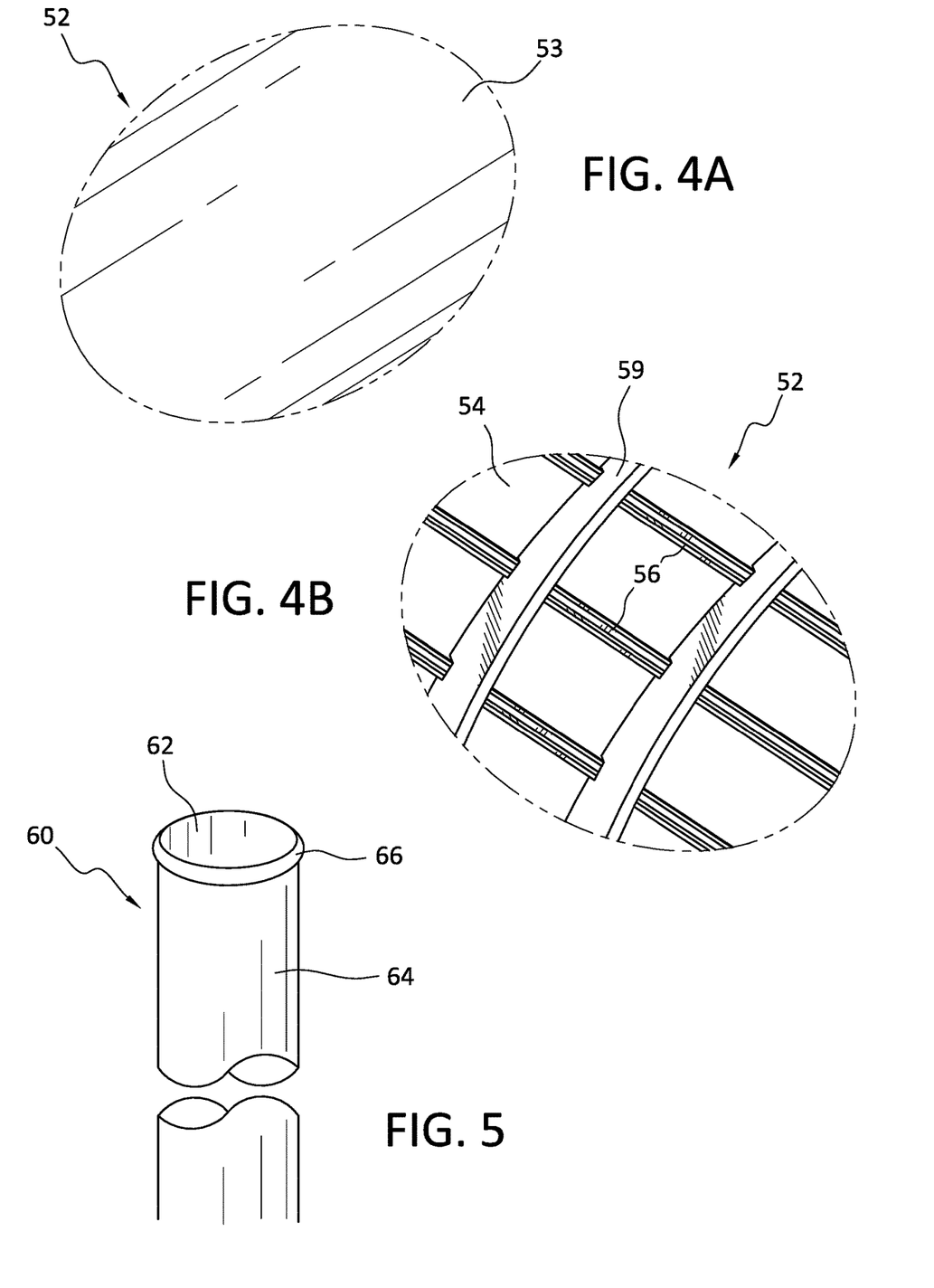
FIG. 4A is a representative illustration of an aircraft fuselage exterior comprising composite structures that can be non-destructively tested according to present aspects.
FIG. 4B is a representative illustration of an aircraft fuselage interior comprising composite structures that can be non-destructively tested according to present aspects.
FIG. 5 is a representative illustration of a pipe comprising composite structures that can be non-destructively tested according to present aspects.

FIG. 3 is a representative illustration of vehicle, in the form of an aircraft 50 that can comprise a component, such as a fuselage section 52 that can, in turn, comprise a composite substrate of the type represented and shown in FIGS. 1 and/or 2. FIG. 4A is an enlarged view of a fuselage section exterior 53 of fuselage section 52 as shown in FIG. 3. FIG. 4B is an illustration of a fuselage section interior 54 of fuselage section 52 as shown in FIG. 3 and/or FIG. 4A. FIG. 4B further shows, in non-limiting fashion, primary structures that can be primary composite structures installed as structural supports and components of fuselage section interior 54, including stringers 56 and frames 59.

FIG. 5 is an illustration of a stationary object in the form of a composite pipe 60 that can be integrated into a pipeline (not shown), with the pipe 60 comprising a composite pipe interior 62, a composite pipe exterior 64, and flange 66. Present aspects contemplate the use of presently disclosed systems and apparatuses shown in FIG. 1 and/or FIG. 2 to non-destructively inspect, for example, adhesive material layers present in composite materials found in at least vehicles and structures of the types illustrated in FIGS. 3, 4A, and/or 4B, as well as other vehicle types, and as well as other structures, including structures that may be designed for stationary use (e.g., pipes, pipelines, ducts, duct work, etc.) as shown in non-limiting fashion in FIG. 5.

According to further aspects, composite structures of the type contemplated as benefiting from the presently disclosed non-destructive inspection methods, systems, and apparatuses include, without limitation, a manned spacecraft; an unmanned spacecraft; a manned aircraft; an unmanned aircraft; a manned hovercraft; an unmanned hovercraft, a manned rotorcraft; an unmanned rotorcraft; a manned terrestrial vehicle; an unmanned terrestrial vehicle; a manned surface watercraft; an unmanned surface watercraft; a sub-surface watercraft; an unmanned sub-surface watercraft, a manned satellite; an unmanned satellite; and combinations thereof.

Present aspects are directed to combining a point-collimated SAXS system with a charged coupled device, such as a CCD camera and appropriate interpreting software to produce a point-by-point non-destructive inspection of an adhesive material interlayer having an average layer thickness ranging from about 0.1 mm to about 5 mm. The adhesive material layer can be an epoxy-based adhesive of the type used to bond layers of epoxy-based composite materials including carbon fiber-reinforced plastics (CFRPs) as well as composite materials incorporating fibers including, for example, carbon/graphite fibers, aramid fibers, boron fibers, glass fibers, and combinations thereof, etc. into a resin-based matrix, such as, for example, an epoxy resin-based matrix. Alternately, the present methods, systems, and apparatuses can non-destructively inspect adhesive layers of non-epoxy-based materials including, for example, adhesives that comprise bismaleimides, cyanate esters, modified acrylates and/or methacrylates, polyurethanes, silicones, etc.

On aircraft, primary structures are defined as structures that carry loads, and whose failure would reduce the structural integrity of the aircraft, for example, during flight, or that may result in injury to passengers or crew, for example, during flight. Accordingly, a significant number of aircraft components are classified as "primary structures" and require periodic inspection as well as initial certification before being placed into service. An illustrative and non-exhaustive listing of primary structures on aircraft include, for example, seats, fuselage structures, wings, vertical tails, braces and fittings for such listed structures, and most structures that carry flight loads, etc.

When composite materials are used in the manufacture of structures, including, for example, aircraft primary structures, such composite materials can include fibrous epoxy resin-based composite materials that include layers of fiber matrices impregnated with, for example, epoxy resin-based material. The impregnated layers are cured and include adhesives interposed between layers as well as cured adhesive layers used to bond composite material substrates to one another, or to bond composite structures to metallic material substrates or to non-metallic material substrates that do not comprise composite materials.

The adhesives used as the adhesive material layer interposed, for example, between the disclosed composite material substrates is any suitable adhesive that can create a degree of bonding deemed adequate by mandated industry specification and/or regulations. Such adhesives can be epoxy-based adhesives that can be curable, as well as adhesives that can be co-curable with the composite substrate materials, for example, during composite substrate manufacture. The as the adhesive cure, or otherwise "set" a bond line is created as a region of material in the adhesive material layer. This area of bonding occurring at the bond line is the area that must be tested and that must physically exceed the currently employed destructive testing methods that can include destructive tensile strength testing, destructive peel strength testing and other mandated testing protocols, etc. By non-inspecting the actual bond line region of adhesive layers in actual structures and objects prior to delivery, or during the useful life of the object, the presently disclosed methods, systems, and apparatuses increase the overall safety of operating the object, by affording a more complete actual inspection of a greater number of sites, especially of hard to access sites as compared to the costly and time-consuming presently known destructive inspection methods over a similar time period.

Understanding and assessing the porosity of an adhesive or other layer in a composite material is important for determining the predictive and actual load-carrying properties of the adhesive and consequently parts comprising adhesive bonding. Porosity of an adhesive material is evidenced by the occurrence of disbonds, gaps due to air or other gas entrapment, crystallization, etc., and the porosity characteristic of an adhesive contributes to the potential of increasing strain values and reducing load values.

By inspecting adhesive material bond lines at the nano-scale level, the presently disclosed methods, systems, and apparatuses provide actual images in real time, during the non-destructive inspection, of specific point-by-point locations and sites within the bond line region of adhesive material interlayers for the purpose of detecting anomalies within the adhesive material, and within a bond line at the nano-scale level. Presently disclosed methods therefore contemplate the ability to discover the presence of nano-scale anomalies at an adhesive bond line region of a composite structure that are not currently thought to be problematic due to, for example, an anomaly dimension that is below a certain threshold, and therefore presently deemed to be acceptable. In other words, presently mandated destructive testing may result in a part or component "passing", while the part or component may actually comprise some degree of anomaly that could not previously be detected according to current testing methods.

The present nano-scale non-destructive inspection methods, systems, and apparatuses therefore not only yield improved inspection levels over known destructive inspecting methods, but the present methods can deliver a level of real time integrity so to be predictive as to the ability of a particular composite material to sustain enhanced operational stress than may be required of a particular part or component. That is, once presently disclosed non-destructive nano-scale testing methods determine the absence of anomalies at the adhesive bond line region, or otherwise determine a degree of detected anomalies that is significantly below a particular acceptable standard, then manufacturing processes, and parts and components manufactured according to manufacturing process (including processes not yet developed) can potentially achieve validation for enhanced loads, allow for enhanced performance tolerances, increase length of service in the field, or help to achieve other advantages that can further serve to reduce replacement cost, interim inspection costs, out-of-service costs, etc. for various parts, components, and structure incorporating such inspected parts and components, etc.

Figure 6:
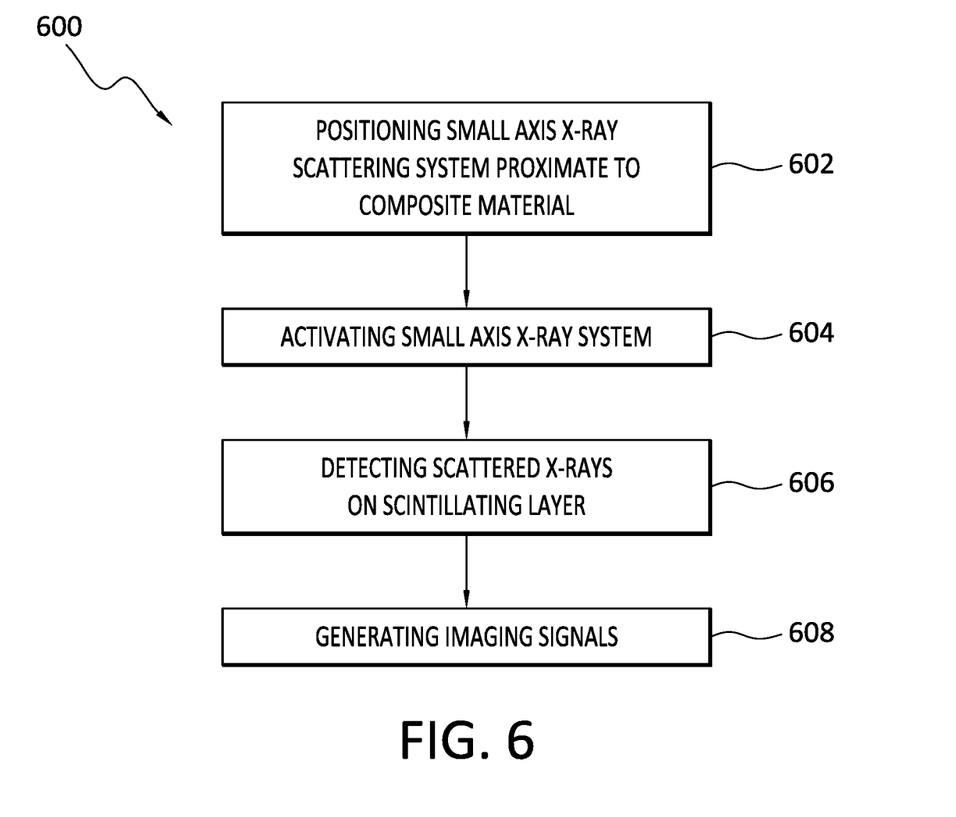
FIG. 6 is a flowchart outlining a method according to present aspects.
Figure 7:
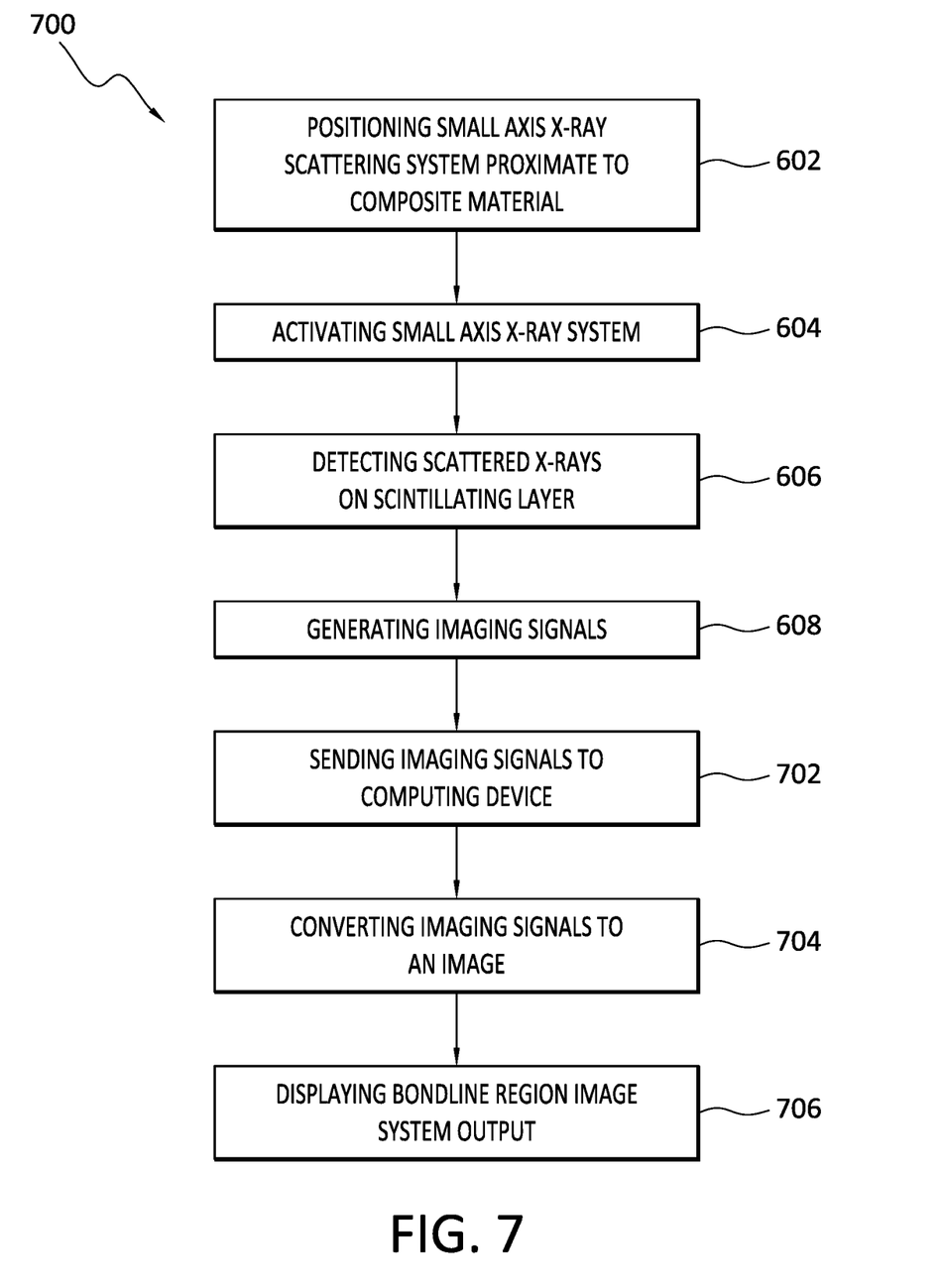
FIG. 7 is a flowchart outlining a method according to present aspects.
Figure 8:
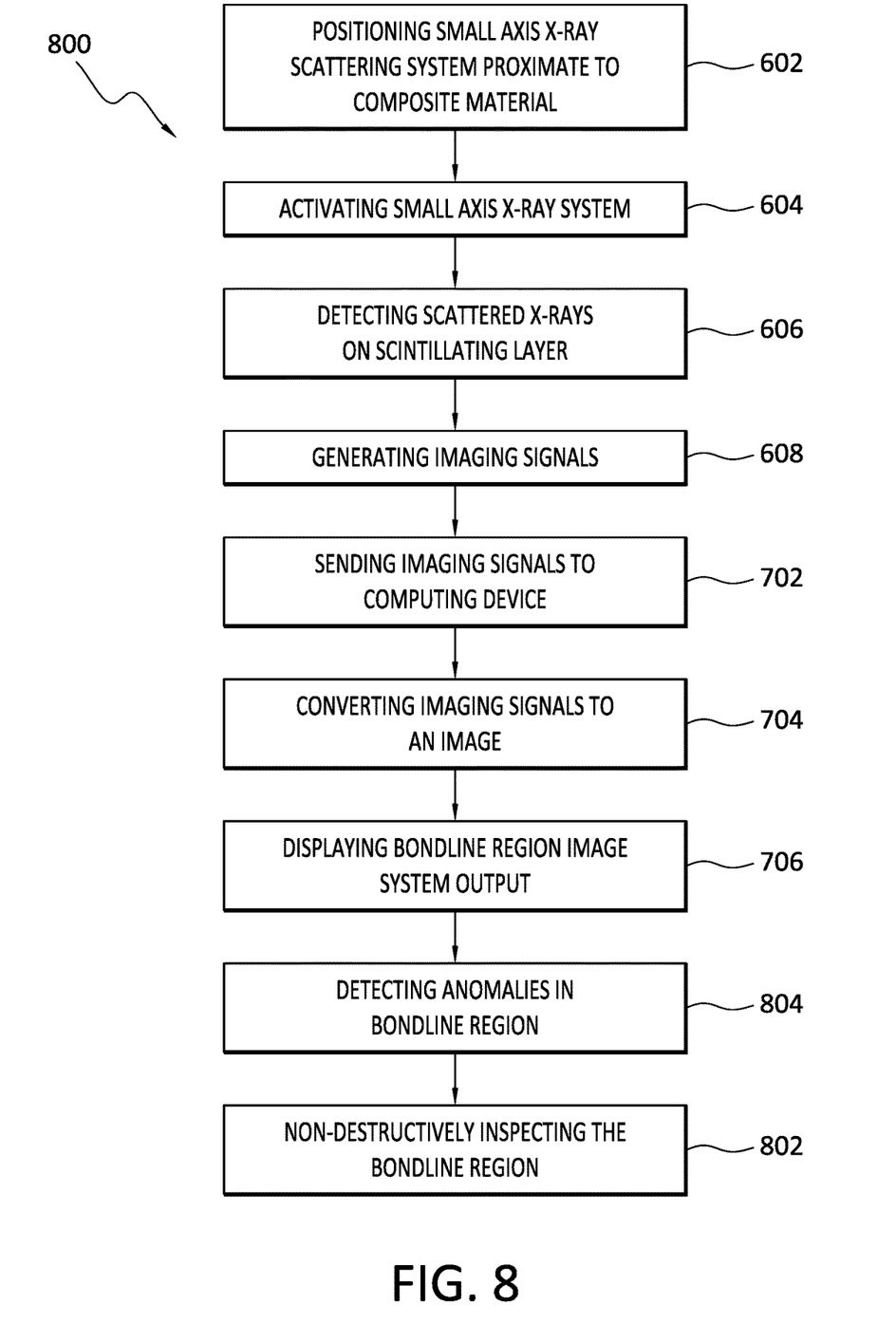
FIG. 8 is a flowchart outlining a method according to present aspects.

FIGS. 6, 7, and 8 are flowcharts outlining illustrative methods according to present aspects. According to FIG. 6, a method is disclosed for non-destructively inspecting a bond line of an adhesive material interlayer of a composite material, with the method including positioning (602) a small angle X-ray scattering system proximate to a composite material, with the composite material comprising a plurality of composite ply stacks, and with the composite ply stacks comprising a plurality of composite plies. The composite ply stacks comprise an adhesive material interlayer interposed between the composite ply stacks, with the adhesive material interlayer further comprising a bond line region. The small angle X-ray scattering system comprises small angle X-ray scattering system first side components positioned on a composite material first side, with the small angle X-ray scattering system first side components comprising: an X-ray source 18, shown as a monochromatic X-ray tube; a first pinhole 20 aperture and a second pinhole aperture 22 positioned a predetermined distance from the X-ray source 18; a first vacuum chamber 24 positioned proximate to the pinhole aperture and the composite material first side. Further small angle X-ray scattering system second side components are positioned on a composite material second side, and comprise: a second vacuum chamber 26 positioned proximate to the composite material second side, said second vacuum chamber in communication with an X-ray scintillator 28; a charged coupled device 30 in communication with the scintillator, with the scintillator comprising a scintillating layer 28a. The method outlined in FIG. 6 further includes activating 604 the small angle X-ray scattering system to emit an X-ray beam from the monochromatic X-ray tube, detecting 606 scattered X-rays on the scintillating layer; and generating 608 imaging signals based on the scattered X-rays impacting the scintillating layer. According to the present disclosure, the bond line may not occur as a "line", but as a "region" within the adhesive material layer. The terms "bond line" and line region" are therefore used equivalently herein, with the understanding that a bond line occurs within a bond line "region". Accordingly, the present methods, systems, and apparatuses non-destructively inspect, and otherwise evaluate a bond line and a bond line region of an adhesive material layer in a composite structure comprising composite materials.

FIG. 7 is a flowchart outlining a method according to present aspects, with the method 700 including the features of the method outlined in FIG. 6, and further including sending 702 the imaging signals of the scattered X-rays generated on the scintillating layer to a computing device, converting 704 the imaging signals into an image; and displaying 706 the bond line region of the composite component as a bond line.

FIG. 8 is a flowchart outlining a method according to present aspects, with the method 800 including the features of the methods outlined in FIG. 6 and FIG. 7, and further including detecting 802 anomalies present in the bond line region.

Figure 9:
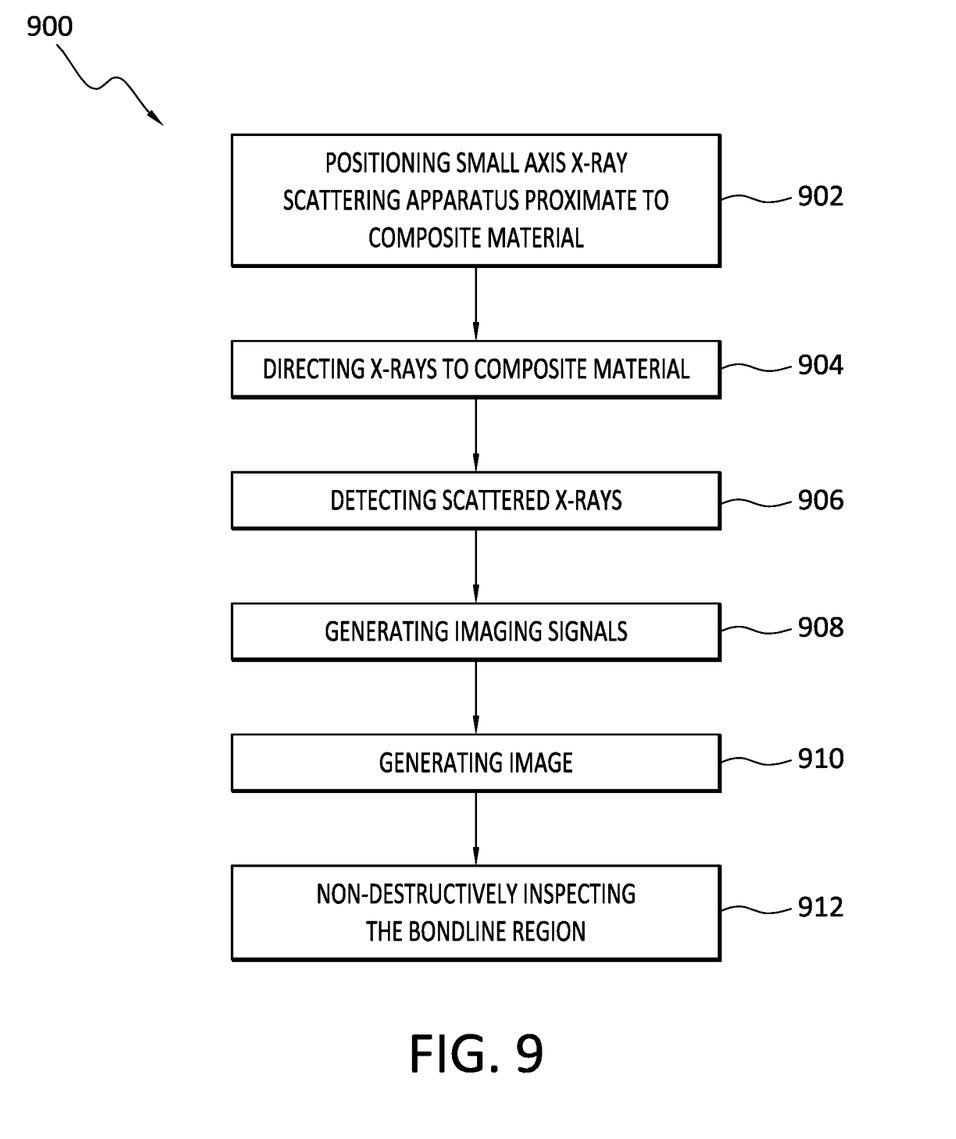
FIG. 9 is a flowchart outlining a method according to present aspects.

FIG. 9 is a flowchart outlining a method for non-destructively inspecting a bond line of an adhesive material layer of a composite material is disclosed, with the method 900 including positioning 902 a small angle X-ray scattering apparatus proximate to a composite material substrate, with the composite material substrate including an adhesive material layer, and with the adhesive material layer including a bond line. The method further includes directing 904 X-rays from the small angle X-ray scattering apparatus to the composite substrate material and detecting 906 scattered X-rays on an X-ray detector, generating 908 imaging signals of the scattered X-rays detected on the detector, generating 910 a two-dimensional image from the imaging signals, and non-destructively determining 912 the integrity of the bond line. The apparatuses and systems illustrated in FIGS. 1 and 2 can be incorporated into and used with the method outlined in one or more of FIGS. 6, 7, 8, and/or 9 for the purpose of non-destructively inspecting bond lines in adhesive material interlayers of composite substrates at least of the types shown in one or more of FIG. 3, 4A, 4B and or 5

Further variations and alternatives of the present disclosure relate to the non-destructive inspection of components and parts that have bond lines such as, for example, composite component parts of any dimension, including components and parts used in the fabrication of larger parts and structures. Such components and parts include, but are not limited to, components and parts designed to be incorporated into stationary objects. Such stationary objects include, without limitation, bridge trusses, support columns and structures, buildings, general construction objects, etc. Further structures and objects include vehicles, such as, without limitation, aircraft, satellites, rockets, missiles, etc., and therefore further include manned and unmanned aircraft, manned and unmanned spacecraft, manned and unmanned rotorcraft, manned and unmanned terrestrial vehicles, manned and unmanned non-terrestrial vehicles, manned and unmanned surface and sub-surface water-borne vehicles, objects, and structures.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method comprising:
    positioning a small angle X-ray scattering system proximate to a composite substrate, said composite substrate comprising an adhesive material layer interposed between a composite substrate first side and a composite substrate second side, said adhesive material layer further comprising a bond line region, with said small angle X-ray scattering system comprising first side small angle X-ray scattering system components positioned on the composite substrate first side, said first side small angle X-ray scattering system components comprising:
    an X-ray source;
    a first pinhole aperture and a second pinhole aperture positioned a predetermined distance from the X-ray source;
    a first vacuum chamber positioned proximate to the first pinhole aperture and the composite substrate first side; and
    with said small angle X-ray scattering system comprising second side small angle X-ray scattering system components positioned on the composite substrate second side, said second side small angle X-ray scattering system components comprising:
    a second vacuum chamber positioned proximate to the composite substrate second side, said second vacuum chamber in communication with an X-ray scintillator;
    a charged coupled device in communication with the X-ray scintillator, said X-ray scintillator comprising a scintillating layer;
    activating the small angle X-ray scattering system to emit an X-ray beam from the X-ray source;
    directing the X-ray beam from the X-ray source through the composite substrate first side and into the interposed adhesive material layer;
    directing the X-ray beam from the interposed adhesive material layer through the composite substrate second side to the X-ray scintillator, said X-ray scintillator located proximate to the composite substrate second side;
    detecting scattered X-rays on the scintillating layer;
    generating imaging signals based on the scattered X-rays impacting the scintillating layer; and
    assessing porosity of the bond line region of the adhesive material layer.
2. The method of claim 1, further comprising:
    sending the imaging signals of the scattered X-rays generated on the scintillating layer to imaging software; generating a bond line image at a nano-scale level; and displaying the bond line image on a display.
3. The method of claim 2, wherein the bond line image is a two-dimensional image.
4. The method of claim 2, further comprising:
    non-destructively detecting anomalies present in the bond line.
5. A method for non-destructively inspecting a bond line region of an adhesive material layer of a composite substrate comprising:
    positioning a small angle X-ray scattering apparatus proximate to a composite substrate, said composite substrate comprising an adhesive material layer, said adhesive material layer comprising a bond line region;
    directing X-rays from the small angle X-ray scattering apparatus to the composite substrate;
    detecting scattered X-rays on an X-ray scintillator;
    generating imaging signals of the scattered X-rays detected on the X-ray scintillator; and
    generating an image from the imaging signals; and
    non-destructively inspecting the bond line region.
6. A system for non-destructively inspecting a composite substrate, said composite substrate comprising a composite substrate first side, a composite substrate second side, and at least one adhesive material layer, said adhesive material layer interposed between the composite substrate first side and the composite substrate second side, said system comprising:
    first side small angle X-ray scattering system components positioned on the composite substrate first side, said first side small angle X-ray scattering system components comprising:
    a monochromatic X-ray source;
    a first pinhole aperture and a second pinhole aperture positioned a predetermined distance from the monochromatic X-ray source;
    a first vacuum chamber positioned between the first pinhole aperture and the second pinhole aperture; and
    second side small angle X-ray scattering system components positioned on the composite substrate second side, said second side small angle X-ray scattering system components comprising:
    a second vacuum chamber positioned proximate to the composite substrate second side, said second vacuum chamber in communication with an X-ray scintillator;
    a charged coupled device in communication with the X-ray scintillator, said scintillator comprising a scintillating layer;
    imaging software in communication with the charged coupled device;
    a display in communication with the imaging software; and
    wherein the system is configured to display a microscopic two-dimensional image of the adhesive material layer.
7. The system of claim 6, wherein the composite substrate comprises a bond line and the system is configured to detect nano-scale anomalies in the bond line.
8. The system of claim 6, wherein the adhesive material layer comprises a bond line and the system is configured to detect nano-scale anomalies in the bond line.
9. The system of claim 6, wherein the adhesive material layer comprises a bond line region and the system is configured to detect nano-scale anomalies in the bond line region.

10. The system of claim 6, wherein at least a portion of the composite substrate comprises a composite material and the system is configured to detect nano-scale anomalies in the composite material.

11. The system of claim 6, wherein the adhesive material layer comprises a cured adhesive material layer and the system is configured to detect nano-scale anomalies in a bond line of the cured adhesive material layer.

12. The system of claim 6, wherein the adhesive material layer comprises an epoxy-based adhesive and the system is configured to detect nano-scale anomalies in a bond line of the epoxy-based adhesive material layer.

13. The system of claim 6, wherein the adhesive material layer comprises at least one of: an epoxy-based adhesive; a bismaleimide-based adhesive; a cyanate ester-based adhesive; an acrylate-based adhesive; a methacrylate-based adhesive; a polyurethane-based adhesive; a silicone-based adhesive; or combinations thereof; and the system is configured to detect nano-scale anomalies in a bond line of the adhesive material layer.

14. The system of claim 6, wherein the system is configured to detect nano-scale anomalies in a bond line of an epoxy-based adhesive material layer.

15. The system of claim 6, wherein the system is configured to detect nano-scale anomalies in a bond line of the adhesive material layer.

16. The system of claim 6, wherein a stationary object comprises the composite substrate, and the system is configured to detect nano-scale anomalies in a bond line in the stationary object.

17. The system of claim 16, wherein the stationary object is a pipe, and the system is configured to detect nano-scale anomalies in a bond line in the pipe.

18. The system of claim 6, wherein a primary structure of a vehicle comprises the composite substrate, and the system is configured to detect nano-scale anomalies in a bond line in the primary structure of the vehicle.

19. The system of claim 18, wherein the vehicle is selected from the group consisting of:
 a manned spacecraft; an unmanned spacecraft; a manned aircraft; an unmanned aircraft; a manned hovercraft; an unmanned hovercraft, a manned rotorcraft; an unmanned rotorcraft; a manned terrestrial vehicle; an unmanned terrestrial vehicle; a manned surface watercraft; an unmanned surface watercraft; a sub-surface watercraft; an unmanned sub-surface watercraft, a manned satellite; an unmanned satellite, and combinations thereof, and the system is configured to detect nano-scale anomalies in a bond line in the vehicle.

20. The system of claim 6, wherein the composite substrate comprises a primary structure of an aircraft, and the system is configured to detect nano-scale anomalies in a bond line in the primary structure of the aircraft.

* * * * *